C. Wheeler, Jr,
Harvester Rake.
No. 113,474. Patented April 4, 1871.
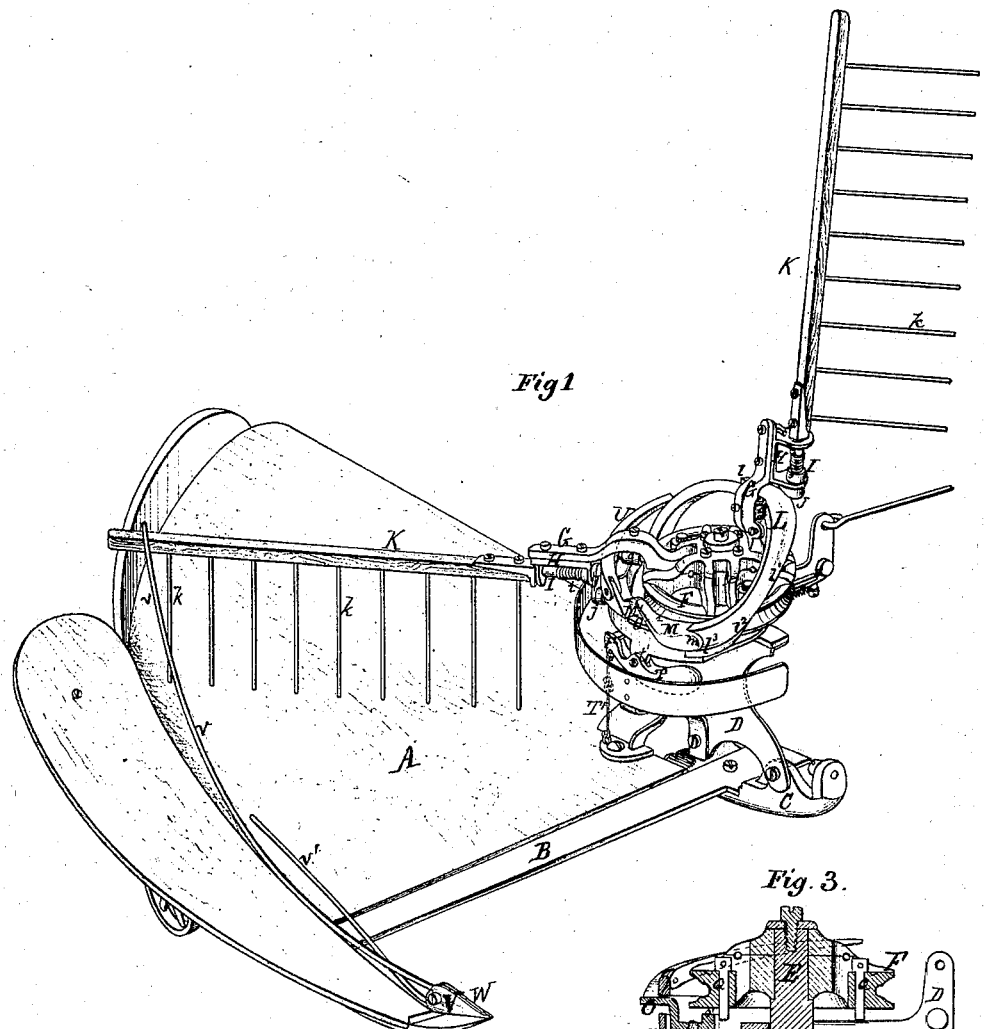
Fig. 1
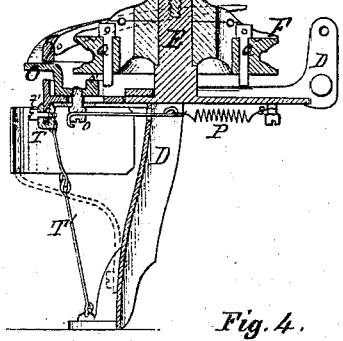
Fig. 3.
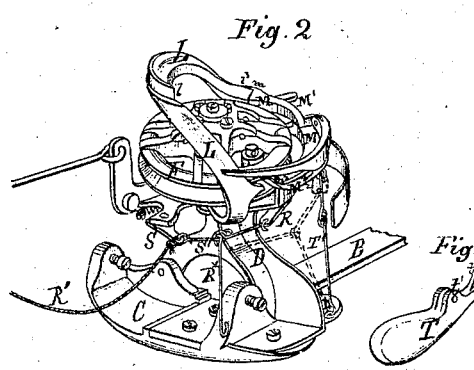
Fig. 2
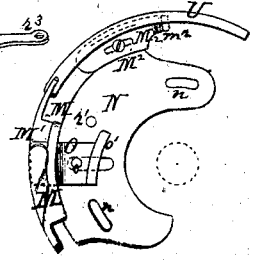
Fig. 4.
Fig. 6.
Fig. 7.
Fig. 5.
Witnesses.
Horace P. Cook
J. H. Woodruff
C. Wheeler Jr.
Inventor

UNITED STATES PATENT OFFICE.

CYRENUS WHEELER, JR., OF AUBURN, NEW YORK.

IMPROVEMENT IN HARVESTER-RAKES.

Specification forming part of Letters Patent No. 113,474, dated April 4, 1871.

*To all whom it may concern:*

Be it known that I, CYRENUS WHEELER, Jr., of Auburn, county of Cayuga, and State of New York, have invented certain new and useful Improvements in Harvesters, of which the following is a full, clear, and exact description, reference being had to the accompanying drawing, making part of this specification, in which—

Figure 1 is a perspective view of the grain-platform and rake attachment taken from the front outer or grain side of the platform. Fig. 2 is a similar view of the rake-stand and rake-actuating devices taken from the rear stubble side. Fig. 3 represents a vertical transverse section of the same; and Figs. 4, 5, 6, and 7 represent certain details hereinafter described.

Similar letters of reference denote corresponding parts wherever used.

The invention relates more particularly to that part or division of the harvesting-machine which performs the operations of gathering, separating, and discharging the crop, and may be classed among what is known as "reel-rakes," and still further distinguished as a "rocking reel-rake."

The nature of the invention consists in imparting to the rake-heads a rocking or rolling motion on their longitudinal axes at four points in their revolution about their vertical shaft or axes, independent of their rising and falling movements.

The object of this part of the invention is, first, to have the rake-heads pass over close to and down by the side of the driving-wheel, so as to gather the crop in a better manner; second, when gathered, to cause it to be laid in better shape upon the platform; third, in discharging the gavels to deliver them upon the ground in better shape; and, fourth, to return the rake-heads to their proper working positions at the end of each revolution.

The nature of the invention further consists in making two of the rocking or rolling points adjustable, for the purpose of bringing the crop farther upon the platform when gathered only, and in discharging the gavel for delivering it upon the ground at a greater or lesser distance from the platform, as the nature or condition of the crop may require; and the invention further consists in combining, with the means for rocking or rolling the rake in depositing the grain on the platform, a means for elevating the rake-heads for their further movement over the platform, to prevent all liability of displacement of the grain thereon by increasing the distance between the rake-head and platform; and the invention further consists in a novel means for adapting the rakes to be worked either automatically or controllably by the driver, or both, as may be desired.

The object of this part of the invention is to adapt the rakes to be set to work automatically in uniform grain, so that any one skillful enough to drive the team can operate it, and the rake will still be so far under the control of the driver that he can prevent the discharge of a gavel in turning a corner, to avoid trampling upon the same by the team, while at the same time the driver, whether the rakes are set to work either automatically or controllably, can cause the rakes to discharge the grain in gavels more or less frequently, or to swath it, as desired.

The means I have adopted for carrying out my invention in practice will be understood from the following description with reference to the drawing, in which—

A is the platform, B the finger-bar, and C the shoe, said parts being constructed and applied to the main frame of the machine in the usual manner.

To the shoe C is bolted the rake-standard D, and to the top of the standard D is fastened the spindle or stud-shaft E, upon which the chain-sheave F is free to revolve.

The spindle E is perpendicular, or nearly so, to the platform, and the latter in practice being slightly inclined downward from rear to front, the spindle is consequently inclined somewhat forward from a vertical line.

The sheave F has hinged to it the rake-arms G, which are provided with friction-rollers g, and also with removable metal bearing-plates H, in the bearings in each of which is mounted a journal or pivot, I, the inner end of which is provided with a crank-lever, J, armed with a friction-roller, j.

The outer ends of journals I are provided with sockets to receive the inner ends of the rake-heads K bolted thereto.

On the journals I are placed spiral springs i, one end of which is fastened to the journal and the other to the journal-plate H, so arranged that the tension of the spring, when not restrained, will turn the rake-journal I and head K into a position with the teeth $k$, following the rake-head, and parallel, or nearly parallel, with the platform in their passage over the same.

To the base of the spindle E, which is provided with a large flange or collar for the purpose, is fastened the track or cam L. This track or cam is so shaped on its inner face as to give the required rising and falling movements to the arms G, the rollers $g$ of which traverse said face as the sheave F revolves, and serve to reduce the friction which would otherwise result.

The front half of the cam L, from the highest point at $l$ to the lowest point $l^3$, is made to act as a track or cam upon both its inner and outer faces, the inner face being traversed by the friction-rollers $g$, as above described, while the outer one, starting at $l$, in a point in the same vertical plane with the inner track, but above it, and diverging outward, interposes itself behind the crank-roller, and serves to operate the crank and rake-journal, rocking or rolling the rake and rake-teeth forward therewith until the teeth are made to assume their working position, and to pass in close proximity to the inner face of the inner drive-wheel, after which, and as the teeth and rake move inward away from the wheel, the width of the cam-ring, or the distance between its inner and outer track, is diminished at $l^1$, the outer track again approaching slightly toward the inner. By this means the rake-head, acted upon by its spiral spring, is caused to rock slightly backward, and the rake-teeth assume a position slightly inclined from a vertical line, with the rake-head in advance (as the rake moves) of the points of the teeth—a position which in practice has been found to be most favorable for action upon the grain in gathering it up to the cutter, and for preventing the rake-teeth from becoming entangled with the grain and drawn down by it into the cutters.

The cam-ring at $l^2$, where it acts upon the rake-head as the latter is passing over the cutters, or thereabout, is again expanded in width, the outer face again diverging from the inner, and the rake-head is again rolled slightly and the points of the teeth advanced quickly, in such manner that, as the grain is severed by the cutters, a blow is imparted by the teeth to the severed grain, which tends to disengage the cut from the uncut grain, and thereby to permit the former to be laid more evenly upon the platform or to be discharged in better shape therefrom.

From the above description it will be seen that the outer face or track extending from $l$ to $l^3$ is made in a wave or undulating form, adapting it to operate or roll the rake at three points—first, for bringing the rake-teeth into working position, and enabling them to pass the drive-wheel; second, for gathering the grain; and, third, for separating the cut from the uncut and depositing the former on the platform.

The fixed or stationary portion of the cam or track terminates at $l^3$; but the track is continued on the inner or platform side by an adjustable extension, M, which overlaps the fixed part at $m$.

The portion M of the track or cam is connected to a base-plate, N, Fig. 4, provided with slots at $n\ n$, through which said plate, with its portion of track, is bolted to the base-plate of track L, in such manner as to permit its adjustment in the arc of a circle of which the rake-spindle E is the center. The outer or lower face of this track M is parallel with the plane of the platform, and connects with the track L by the lap-joint at $m$, so that under any adjustment of the former a uniform surface for the crank-rollers to traverse is secured.

The track M is provided at $M^1$ with an inclined way or opening for the crank-roller, through or upon which said roller may escape from the outer or lower track to the upper, for permitting the rake-teeth to roll or lift out of the grain after it has been deposited on the platform, and is made in the form of an inclined slot through the track M.

O is a slide, the lower face of which is in the same plane with the lower face of track M. Said slide is arranged to move horizontally in the inclined opening, and, when thrown out into the position shown in Figs. 1 and 4, serves to form a continuation of the lower face of track M, covering the opening or escape $M^1$, and carrying the crank-roller past said opening, thereby maintaining the rake-teeth in their vertical working position for sweeping the platform and discharging the grain.

The slide O (shown in Figs. 2 and 5 and in plan view, Fig. 4) rests upon the base-plate N, and is connected, through a pin, $o$, on its under face, and passing through a slot in plate N, with a spring, P, the tension of which serves to hold the slide withdrawn from the opening $M^1$, when not overcome by means hereinafter described.

Q Q are pins inserted in the rake-sheave slightly in advance of the rake-arms, said pins passing through the sheave, and operating upon a flange, $o'$, on the inner inclined face of slide O, for forcing the slide outward and closing the opening M, to prevent the escape of the crank-roller when desired.

R is a lever, pivoted at $r$ to the base-plate N at $r^1$, and connected by one of its arms at $r^2$ to the slide-pin $o$, the other end of said lever, $r^3$, having a cord, R', connected with it, and extending, either directly or through links and levers S S', into a convenient position to be operated by the driver on the machine, for enabling the driver to operate slide O.

For the purpose of holding the slide when thrown out either by the pins Q or lever R, as described, the lever R, which is vibrated in either case, is provided with an arm or projection, $r^4$, which, when the slide is out, engages with a shoulder, $t$, on one end of a weighted dog or lever, T, Fig. 7, pivoted at $t^1$ to a pendent lug on the track-plate N. (See Figs. 1 and 3.)

The dog or lever T is connected, by a cord or jointed link, T', with the base of the rake-standard, said link serving to limit the upward throw of the dog consequent upon its opposite end being weighted; and the arm $r^4$ of lever R, as the latter is vibrated together with the slide, serves to depress the locking or shouldered end of the dog until it passes and engages with said shoulder $t$, which is thereby made to hold the lever and slide until the crank-roller has passed the slide and the opening $M^1$, as above explained.

The lower face of track M serves, after the crank-roller has passed the latter, to hold the rake-teeth to their work while passing over the platform to the point of discharge of the gavel, when the roller, reaching incline or opening $m^2$, escapes or rises, and permits the rake-head to rock or roll, for lifting the teeth out of the grain.

The inclines $M^1$ $m^2$ are, by preference, so proportioned or made at such an angle that the forward movement of the rake-head in passing the same, in connection with rolling movement of the rake, shall be such that the points of the teeth shall be retarded to an extent that will cause them to be lifted vertically, or nearly so, out of the grain.

By the adjustment of base-plate N and its portion M of the cam-track the position of the incline $M^1$ relative to the platform, and consequently the point at which the rake-teeth leave the grain upon the platform, may be varied as desired.

Connected with the outer or rear end of track M is an extension-piece, $M^2$, provided with a curved slot, through which it is bolted to track M, in such manner as to permit its adjustment independently of said track in the arc of a circle of which the spindle E is the center, and so united to track M by a lap-joint as to present on its under side an unbroken continuation of the track for the rollers $j$ to pass over. The rear end of this extension-piece is beveled or inclined upward and backward at $m^2$, for a purpose which will be presently described.

On the top of track M is an inclined rail, U, hinged at its forward end to said track, and serving as a supplemental track for regulating the path of the rake, as hereinafter explained.

The operation of the parts above described is as follows: As the machine is moved forward by the team, the chain-sheave F, operated in any usual manner, revolves on its spindle E, carrying with it the hinged arms G, the rollers $g$ of which traverse the inner surface of cam L. When the arms G reach the inner or frame side of the cam, and are in a vertical, or nearly vertical, position, the crank-rollers on the ends of the rake-journals are brought against the elevated point $l$ of the outer track, and, following the said track, serve to rock or roll the points of the rake-teeth forward for passing over the drive-wheel, as above described.

As the rollers $j$ advance farther they enter the depressions $l^1$ in the outer track, and the teeth roll back slightly, so as to pass down close by the side of the drive-wheel, in such manner as to get well behind the grain or crop to be gathered, after which, as the rollers are further advanced and reach the swell $l^2$ in the outer track, the teeth are again rocked forward and assume a vertical position at or before reaching the cutters, in which position they are held until the roller reaches the opening $M^1$ in the track M, at which point the recoil of the spring $i$, aided by the resistance of the grain, turns the journals I, and the roller $j$ passes through the opening $M^1$ up to the upper face of track M and over the hinged inclined rail U, by means of which the rake-heads will be well elevated above the platform until the rollers $g$ reach the track L, and the rake-heads are again raised to the vertical position for repeating the operation above described.

When enough grain has accumulated on the platform for a bundle, the slide O is moved outwardly by means of a pin, Q, so as to close the opening $M^1$ in the track M, and roller $j$ is forced to follow the under surface of said track, and the rake-teeth are thereby maintained in a vertical position, sweeping before them the accumulated grain, and delivering the same upon the ground, when, the roller $j$ passing off the rear inclined end of extension-piece $M^2$, the rake-heads are freed from restraint and the teeth rock back, leaving the butts of the grain in better condition than would be the case if the rake-heads were raised without the rocking motion. The point at which the rake-heads shall rock back in delivering the grain can be varied at pleasure by the adjustment of the extension-piece $M^2$ of track M, as explained. As the roller $j$ passes off the end of extension-piece $M^2$ it is brought in contact with the free end of the hinged inclined rail U, which rises and permits the roller to pass as the rake-head rises.

From the foregoing description it will be seen that the point at which the grain is deposited on the platform can be varied at pleasure, that the point of delivery can also be changed at pleasure, and that either or both of these changes can be made without changing the point at which the rake-teeth take hold of the crop in the gathering process.

The slide O, by means of which the rakes are changed from gathering to discharging devices, is controlled as follows: First, by the cord R', connected at one end with the lever R, and at the other with a treadle, (not shown in drawing) operated by the foot of the driver at pleasure. As often as the treadle is pressed the slide O is forced outward, and is locked in that position by the dog T engaging with arm $r^4$ of lever R, and remains so locked until the roller $j$ has passed under the slide and comes in contact with the curved or cam-shaped end $t^2$ of the pivoted dog, forcing the same downward and releasing the lever R, when the recoil of the spring P withdraws the slide O, and leaves the roller of the next succeeding rake free to pass up through the opening $M^1$.

Under this arrangement, if the driver desires to lay the grain or any portion of it in a swath he can do so by simply continuing the pressure of his foot upon the treadle which operates the slide $o$.

Another method of operating the rake is one which makes it automatic, as follows: By inserting one or more pins, Q, in the perforations in sheave F, as above described, as the sheave revolves, the lower ends of said pins are brought against the inclined flange $o'$ on the inner end of slide O, and the latter is moved outward, closing the opening M, and is locked in this position by the dog T and lever R until released by the crank-roller, as before explained.

Under this arrangement the rake is made automatic in its action, and requires no attention from the driver.

By inserting one pin, Q, in the sheave, the slide is thrown out once in each revolution of said sheave, and one rake is made to discharge the grain. By the use of two pins two of the rakes are made to discharge the grain; and if as many pins are inserted as there are rake-arms employed, one in advance of each arm, all the rakes will act to discharge the grain, which will thereby be delivered in a continuous swath.

When the rakes are thus set to work automatically, one or all, by changing the cord R', or disconnecting it from the lever R and connecting it, either directly or by a link, R×, to the link or cord T', which limits the upward throw of the locking end of the dog T, the driver can, by operating the treadle or cord R', deflect said link T', as shown in dotted lines in Fig. 2, thereby holding the dog down, and prevent it from locking the slide O, and said slide will be instantly retracted by its spring, in such manner as to permit the roller $j$ to escape through opening $M^1$, allowing the rake-teeth to rock up out of the grain while on the platform.

It will thus be seen that, when working automatically, the driver has still control of the delivery, and can prevent the discharge of a gavel in the track of the team in turning corners, or when light, thin spots are met with in a field that is of generally uniform growth, thereby enabling him to regulate the size of the gavels when desired.

The supplemental yielding divider is composed of metal rods $v\ v'$, fastened to the top of the ordinary divider, near its point, by a clamping-plate, V, which is bolted to an ear or flange, W, on the point of the divider. Two rods are represented; but more may be used, if found desirable. The longer one, $v$, may be quite long, and is elevated at its rear end, and is curved or bent inward, so that the outer ends of the rake-heads will pass under it. The shorter one, $v'$, is placed lower and inclined inward, so that the outer tooth of the rake will pass in close proximity to it, and the projecting end of the rake-head over it.

It will thus be seen that the projecting ends of the rake-heads, as they sweep across the platform, pass between the rods $v\ v'$, which, being elastic, will yield under an accumulation of grain and allow it to pass more easily, thus diminishing the tendency to clog, while at the same time they relieve the rake-heads of the strain and danger of breakage consequent upon the use of a rigid divider.

Having now described my invention, what I claim as new, and desire to secure by Letters Patent, is—

1. The rocking rake-heads, in combination with the controlling cam or track L, made in the manner substantially as described, to impart the several rocking or rolling movements to said rake-heads during their passage over the same, substantially as described.

2. The adjustable track M, provided with the way or opening $M^1$, in combination with the stationary cam or track L, substantially as described.

3. The adjustable extension-piece $M^2$, in combination with the track M, for adjusting the point of discharge of the gavel, as described.

4. The combination of adjustable track M and independently-adjustable extension or tail-piece $M^2$ with the stationary track or cam L, for regulating the point of delivery of the grain upon the platform or upon the ground (either or both) without changing the point at which the rakes enter the standing grain for gathering the same to the cutters, as described.

5. The inclined way or ways $M^1\ m^2$, in combination with the rocking rake-heads, for giving a vertical, or nearly vertical, lift to the points of the rocking teeth as the latter leave the grain, substantially as described.

6. The slide O, for closing the opening $M^1$ in the track M, in combination with the rocking rakes, operating as described.

7. The slide O, in combination with the lever R and locking-dog T, substantially as described.

8. The removable pins Q, in combination with the slide O, constructed and operating as described, for automatically closing the opening $M^1$, substantially as described.

9. The dog T, in combination with lever R, for locking the slide O, arranged as described, whereby said dog is automatically tripped by the crank-roller *j*, for releasing the slide after the roller has passed by and been operated upon by the slide, as described.

10. The tripping-cord R', in combination with the dog T, for enabling the driver to control the slide O, when the latter is thrown out automatically, as described.

11. The combination-track M, hinged rail U, rocking rake-head, vibrating rake-arm, and carrying-wheel or sheave F, substantially as set forth.

C. WHEELER, Jr.

Witnesses:
 HORACE T. COOK,
 J. H. WOODRUFF.